(12) United States Patent
Hiatt

(10) Patent No.: US 9,779,639 B1
(45) Date of Patent: Oct. 3, 2017

(54) STRUCTURALLY COMPACT DISPLAY ASSEMBLY

(71) Applicant: REVOLUTION SIGN AND MEDIA GROUP LLC, Springfield, OR (US)

(72) Inventor: Richard Wendell Hiatt, Springfield, OR (US)

(73) Assignee: REVOLUTION SIGN AND MEDIA GROUP LLC, Springfield, OR (US)

( * ) Notice: Subject to any disclaimer, the term of this patent is extended or adjusted under 35 U.S.C. 154(b) by 232 days.

(21) Appl. No.: 14/679,979

(22) Filed: Apr. 6, 2015

Related U.S. Application Data

(60) Provisional application No. 61/975,580, filed on Apr. 4, 2014.

(51) Int. Cl.
G09B 29/00 (2006.01)

(52) U.S. Cl.
CPC ......... *G09B 29/002* (2013.01); *G09B 29/001* (2013.01)

(58) Field of Classification Search
USPC ............... 434/408, 416, 421, 425, 428, 430; 40/600, 611.1, 711, 768, 771
See application file for complete search history.

(56) References Cited

U.S. PATENT DOCUMENTS

| | | | | |
|---|---|---|---|---|
| 5,309,659 A | * | 5/1994 | Eastman | A47G 1/06 248/206.5 |
| 5,655,323 A | * | 8/1997 | Lassoff | G09F 7/08 40/611.1 |
| 5,741,561 A | * | 4/1998 | Lenkin | G09B 3/02 273/240 |
| 6,241,528 B1 | * | 6/2001 | Myers | B43L 1/00 434/408 |
| 6,374,523 B1 | * | 4/2002 | Smith | G09F 7/02 40/594 |
| 7,219,460 B1 | * | 5/2007 | Grayson | A47G 1/06 40/700 |
| 7,246,458 B2 | * | 7/2007 | Ternovits | G09F 7/04 40/600 |
| 7,874,842 B2 | * | 1/2011 | Beno | A63F 9/0641 434/408 |
| D688,745 S | | 8/2013 | Lyons | |
| 8,608,486 B1 | * | 12/2013 | Brashear | B43L 1/00 434/408 |
| 8,641,426 B2 | * | 2/2014 | Yang | A63B 71/06 434/247 |
| 8,672,687 B2 | * | 3/2014 | Shanbour, II | B43L 1/00 434/408 |
| 8,959,817 B1 | * | 2/2015 | Barnes | G09F 7/04 40/711 |
| 2009/0068632 A1 | * | 3/2009 | Thompson | B43K 23/001 434/416 |
| 2009/0199445 A1 | * | 8/2009 | Blaeser | B44C 5/02 40/600 |

(Continued)

*Primary Examiner* — Kurt Fernstrom
(74) *Attorney, Agent, or Firm* — Timothy E. Siegel Patent Law, PLLC; Timothy E. Siegel

(57) ABSTRACT

A media display assembly that has a base assembly, including a base and a steel plate, which forms a front surface of the base assembly and is removeably affixed to the base. Also, a cover includes a polymeric sheet having transparent display portion and a rearward extending peripheral wall, the peripheral wall snugly fitting the base assembly. Finally, display media is interposed between the steel plate and the cover.

18 Claims, 6 Drawing Sheets

(56) References Cited

U.S. PATENT DOCUMENTS

| | | | |
|---|---|---|---|
| 2011/0091860 A1* | 4/2011 | Supera | B32B 37/182 434/409 |
| 2013/0101979 A1 | 4/2013 | Shanbour, II et al. | |
| 2013/0106055 A1* | 5/2013 | Knox | A63F 3/00694 273/239 |
| 2013/0323707 A1 | 12/2013 | Lyons et al. | |
| 2013/0326922 A1 | 12/2013 | Lyons et al. | |
| 2014/0154661 A1* | 6/2014 | Bookbinder | B43L 1/002 434/408 |
| 2014/0199678 A1* | 7/2014 | Tunis | F41H 5/08 434/408 |
| 2014/0315184 A1* | 10/2014 | Jorgenson | B43L 1/00 434/408 |
| 2014/0377736 A1* | 12/2014 | Essen | B43L 1/008 434/408 |

* cited by examiner

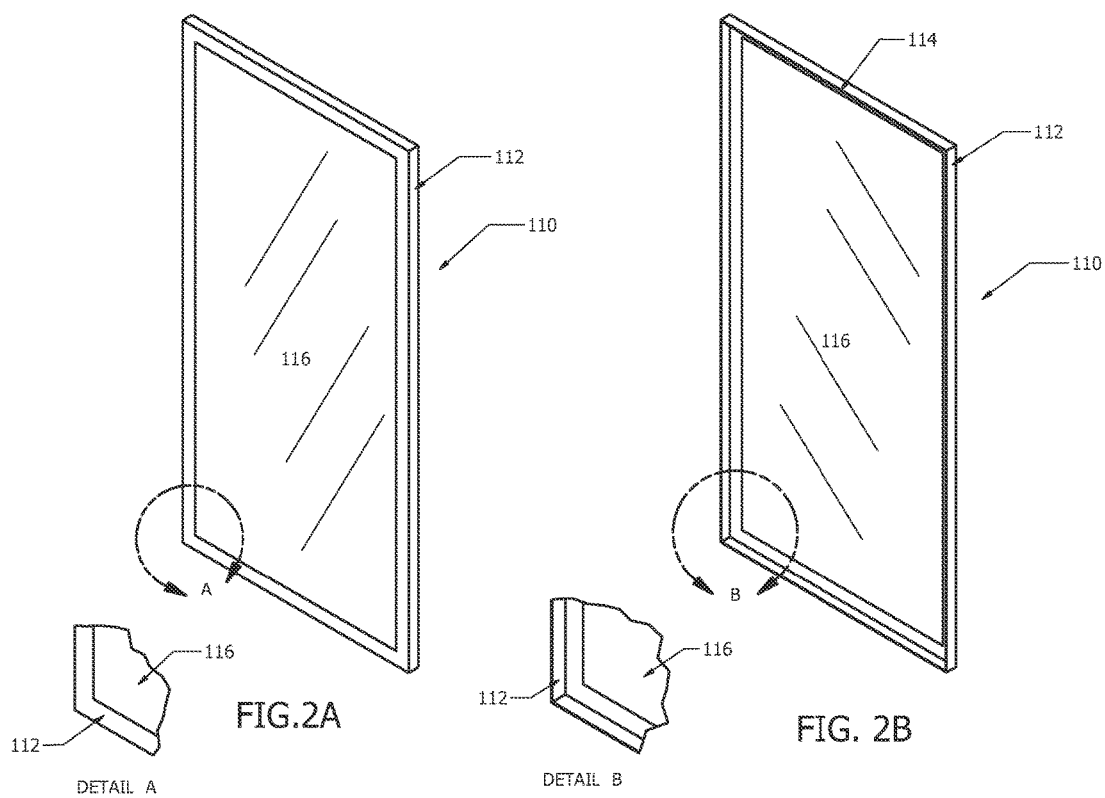

STRUCTURALLY COMPACT DISPLAY ASSEMBLY

RELATED APPLICATIONS

This application claims priority from provisional application Ser. No. 61/975,580, filed on Apr. 4, 2014, which is incorporated herein by reference as if fully set forth herein.

BACKGROUND

A type of display board is currently available for providing an interchangeable background, covered by a transparent acrylic sheet. In one style of this type of board, the acrylic sheet is mounted to a hinge at its top, and retained by magnets at its bottom. The magnets are attracted to a steel sheet that is about 0.32 mm thick, to which the acrylic sheet hinge is also mounted. To provide or change the semi-permanent display, the cover is opened and printed media, in the form of printed coated paper or polymeric material is placed over the steel sheet, and the Plexiglass cover is closed. This provides the user with a board having a printed background, but that he can write on with a marker, and later erase. As an example, a basketball coach may want a board having a basketball court scheme as a background, upon which he can draw basketball plays. Using the board described above he could order a basketball court scheme on cardboard or polymeric media and place it between the metal backing and the acrylic sheet cover, close the cover, and then mark the plays on the acrylic sheet. During football season the board could be provided with a football scheme background and provided to the football coach, who could draw football plays on it. In a medical environment, a board assembly in an ear, nose and throat specialist's office could be used to show a background media of the human throat, permitting the physician to mark on the clear plastic over this media, to illustrate a throat procedure. The same style of board could be used in a cardiologist's office with media showing the interior of the human heart, to permit the cardiologist to explain a cardiac procedure to a patient.

Unfortunately, many of the available boards of this nature are problematic. First, many include a wood backing to the steel sheet, thereby making the board quite heavy. Moreover, wood forming a portion of the board causes the board's use to be prohibited in many portions of a hospital, including patient rooms. Any porous material, such as wood, provides places for microbes to dwell, where it is difficult for sanitizing agents to reach. Also, as the principal structure of the board is wood, the steel sheet tends to be quite thin, on the order of a third of a millimeter. Also, a frame is generally used to hide the layered construction from users, and to forestall potential delamination. This adds to the weight of the board and provides additional covered areas for harmful microbes to live.

Further, in some hospital rooms a "terminal cleaning" is performed when a patient with a highly infectious condition is discharged. In this procedure, everything in the room is hosed down with bleach. Boards that include wood or a laminated panel as part of their construction tend to be damaged by being exposed to large amounts of bleach water. In like manner, boards containing wood may also be more vulnerable to becoming warped if left outside in the rain, as an advertising sandwich board might be left.

Finally, the differing coefficient of thermal expansion of the wood versus the steel sheet tends to cause warping in the steel sheet. It appears that this has necessitated the use of a thicker acrylic sheet than would otherwise be necessary, so that the weight of the acrylic sheet can hold the media in place, even against an uneven backing surface.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a media display assembly that has a base assembly, including a base and a steel plate, which forms a front surface of the base assembly and is removeably affixed to the base. Also, a cover includes a polymeric sheet having transparent display portion and a rearward extending peripheral wall, the peripheral wall snugly fitting the base assembly. Finally, display media is interposed between the steel plate and the cover.

In a second separate aspect, the present invention may take the form of a display assembly, that includes a base made of polymeric material, having a front wall of at least one hundred square centimeters in area, and a rearward extending base peripheral wall of at least 0.5 cm height, the front wall having a front surface and having recessed regions, wherein the recessed regions are recessed such that the back of the recessed regions extend at least as far back as the peripheral wall, so that when the base is placed against a flat surface the recessed regions touch the flat surface. A polymeric cover is adapted to fit over the base, and includes a generally transparent front wall, and a rearward extending cover peripheral wall, sized to fit about the base peripheral wall, so that when the cover is placed over the base there is a slight tension between the cover peripheral wall and the base peripheral wall. Further, display media is interposed between the base and the cover.

In a third separate aspect, the present invention may take the form of a method of improving staff awareness of patient conditions such as allergies to medicines and contagious conditions, which require special measures, in a set of hospital rooms. The method utilizes a patient information board in each one of the set of hospital rooms. Each such board has a base attached to an interior surface of the room, a steel plate supported on the base, a generally transparent cover positioned over the base and printed media interposed between the steel plate and the cover. The method also utilizes a set of magnetic informational pieces, collectively bearing a diverse array of patient conditions requiring special measures and a set of markers that can mark on the cover. Also, the cover is thin enough and the magnetic informational pieces are strongly magnetic enough so that a magnetic informational piece placed on the cover is retained by magnetic attraction to the steel plate, through the cover and the printed media. In the method, when a new patient is placed in a hospital room, patient identifying information is written on the cover with one of the markers and one or more magnetic informational pieces are placed on the cover, indicating patient information requiring special measures.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 2A is an isometric front-top view of a cover for the display assembly of FIG. 1.

FIG. 2B is an isometric rear-top view of a cover for the display assembly FIG. 1.

DETAILED DESCRIPTION OF THE PREFERRED EMBODIMENTS

Figure 1:
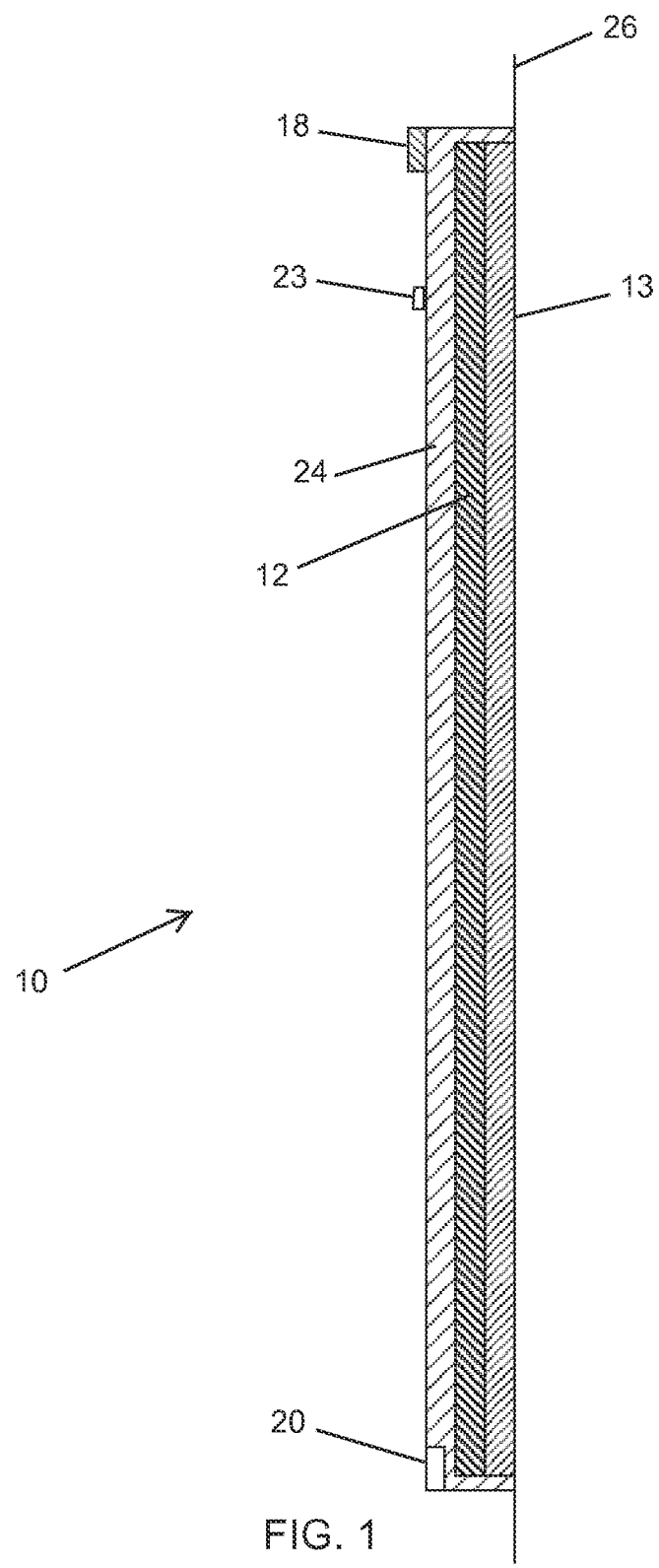
FIG. 1 is a side view of a first preferred embodiment of a display assembly, according to the present invention.
Figure 3A:
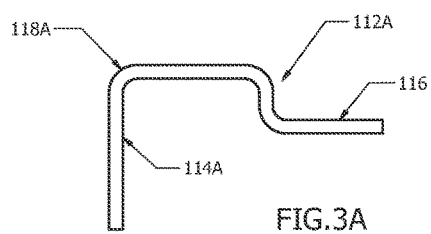
FIG. 3A is a sectional view of the periphery of an embodiment of the cover of FIGS. 2A and 2B.
Figure 3B:
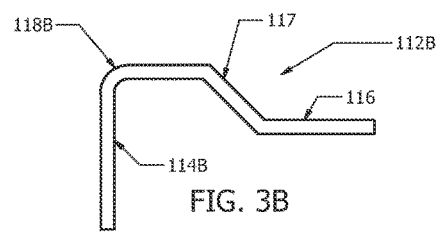
FIG. 3B is a sectional view of the periphery of an alternative embodiment of the cover of FIGS. 2A and 2B.
Figure 3C:
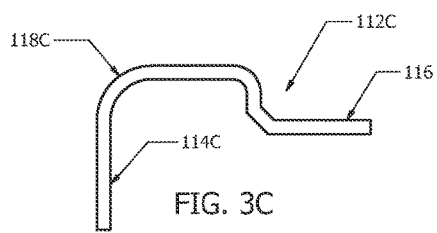
FIG. 3C is a sectional view of the periphery of an additional alternative embodiment of the cover of FIGS. 2A and 2B.
Figure 3D:
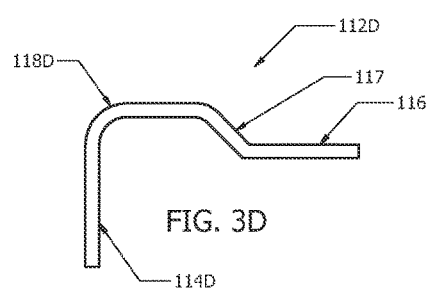
FIG. 3D is a sectional view of the periphery of another additional alternative embodiment of the cover of FIGS. 2A and 2B.
Figure 3E:
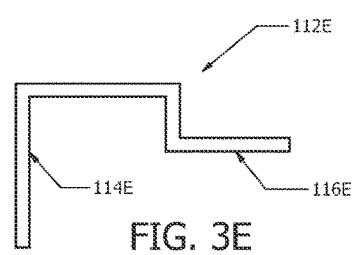
FIG. 3E is a sectional view of the periphery of yet another additional alternative embodiment of the cover of FIGS. 2A and 2B.

FIG. 1 shows an exploded sectional side view schematic representation of a media display board assembly 10 according to the present invention. A generally transparent polymer cover 12 includes embedded magnets 20 that retain cover 12 on a steel plate 13, which serves both as a magnet anchor and as the principal support of the media display board. Steel plate 13 is preferably of 26 to 35 gauge steel. Cover 12 is held in place by a set of rare earth magnets 20 (only one shown). A false border 18 is formed or printed on cover 12. This provides an impression of a frame to a user, while avoiding the added weight of the frames of prior art boards. Magnetic media 23 may be applied directly against steel plate 13 or on cover 12.

The assembly 10 and system described above have many advantages. Using the steel plate 13 as the structural support as well as the magnetic backing permits the creation of a lighter board, relative to currently available boards, of roughly one pound per square foot of board, versus about two pounds per square foot of board for currently existing boards. Further, because a thicker steel plate is used, more magnetic attraction is formed with the same power magnet. As a result, media may be magnetically retained on the exterior of the polymeric cover 12. This permits a system including magnetic media 23, designed to be stuck to the outside of the cover 12. For example, in a hospital setting, an assembly 10 can be provided on the door of each patient room, and magnetic media advisories can be attached as desired. For example, magnetic media 23 advisories for MRSA, could be kept on hand and deployed on assemblies 10 as required, to effect a warning to health care workers. Such magnetic media could be fashioned to be very prominent and to catch the attention of medical workers, more so than a simple message written using a marker. A magnetic media background 24 can be deployed directly on plate 13, to provide a semi-permanent background. For example, in the example given above, this could be provided for each room board 10, and changed seasonally to reflect different hospital initiatives.

In one embodiment plate 13 may be "dimpled"—that is, looking at plate 13 from the front a number of indents would be visible, and viewing from the rear, corresponding protrusions. These dimples both create some depth for plate 13 and provide a number of places where a drill can be used to broach plate 13, to permit the introduction of a fastener such as a wood screw, which may then by screwed into a wall 26 to support assembly 10. Also, a tray on the bottom of assembly 10 may be provided to hold markers and an eraser. In a preferred embodiment, this tray is attached lightly, so that it can easily snap off, and is made with edges that have all been blunted, as the steel trays currently in use have proven to be a hazard to those working with these boards, as some have been cut by the steel trays.

FIGS. 2A and 2B show a front and rear view, respectively, of a cover assembly 110 that includes a frame 112, which includes a rearward extending peripheral wall 114, the upper, horizontal portion of which permits assembly 110 to rest on the upward surface of steel plate 13 (FIG. 1). A clear polymeric panel 116 is thereby kept in front of plate 13, when desired. FIGS. 3A-3E show a detailed sectional view of each of five different configurations (112a-112e) for the frame 112. The purpose of these differing frames is to permit the assembly 110 to hang from the steel plate 13, to present an aesthetic appearance and to provide a border. In a preferred embodiment the frame 112 is opaque and colored, to provide the illusion of an entirely separate frame. The protruding portion of frames 112a, 112c and 112e is ⅜ of an inch wide, and for all frames 112a-112e the protruding portion juts out ¼ inch from panel 116. For frame 112b and 112d, the protruding portion is ½ inch wide with a sloping portion 117 adding another ½ inch of width. All peripheral walls 114a-114e extend to the rear by ⅜ of an inch. From the side, for example viewed from a distance down a corridor, the entire assembly 110 will appear to be a solid unit protruding from the wall. In one preferred embodiment, peripheral wall 114 includes a flange extending inwardly toward the center of assembly 110, so that it interlocks with plate 13. Corners 118a and 118b have a radius of curvature of ⅛ inch, whereas 118c and 118d have a radius of curvature of ¼ inch. All of the corners of 118e are sharp, right angles.

Figure 4:
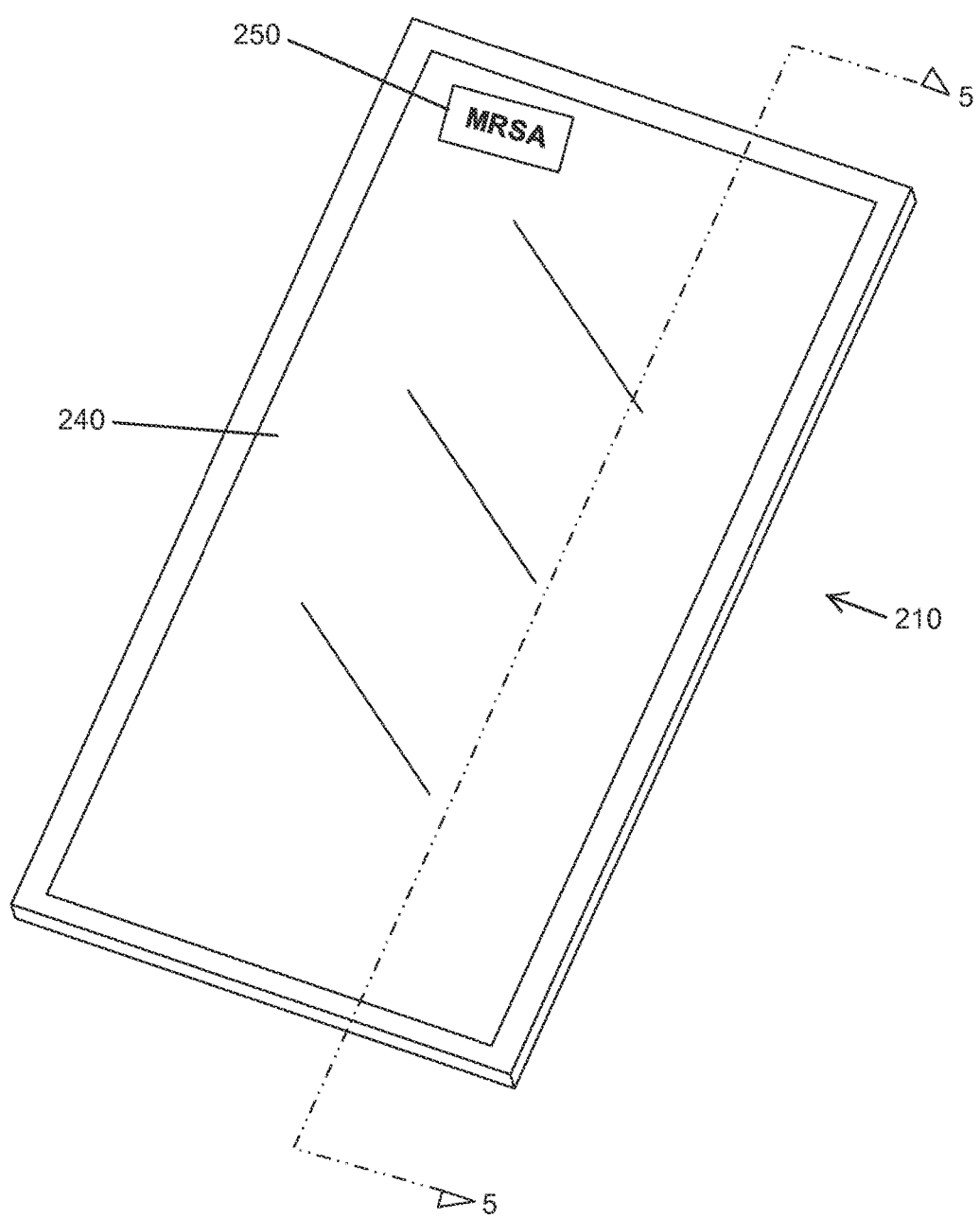
FIG. 4 is an isometric view of a second preferred embodiment of a display assembly, according to the present invention.
Figure 5:
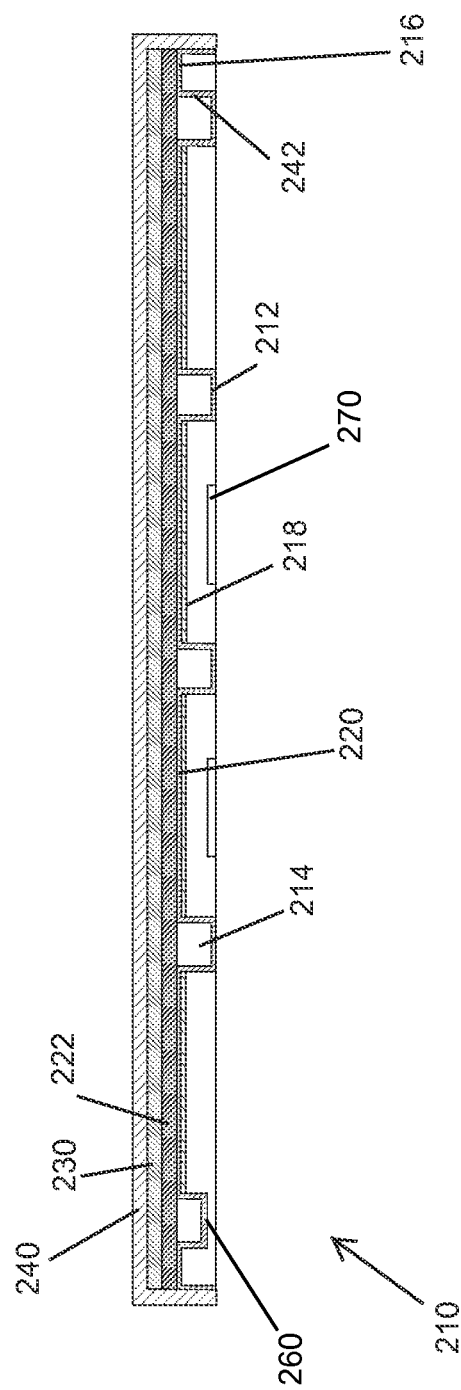
FIG. 5 is a sectional view of the display assembly of FIG. 4, taken along line 5-5 of FIG. 4.
Figure 6:
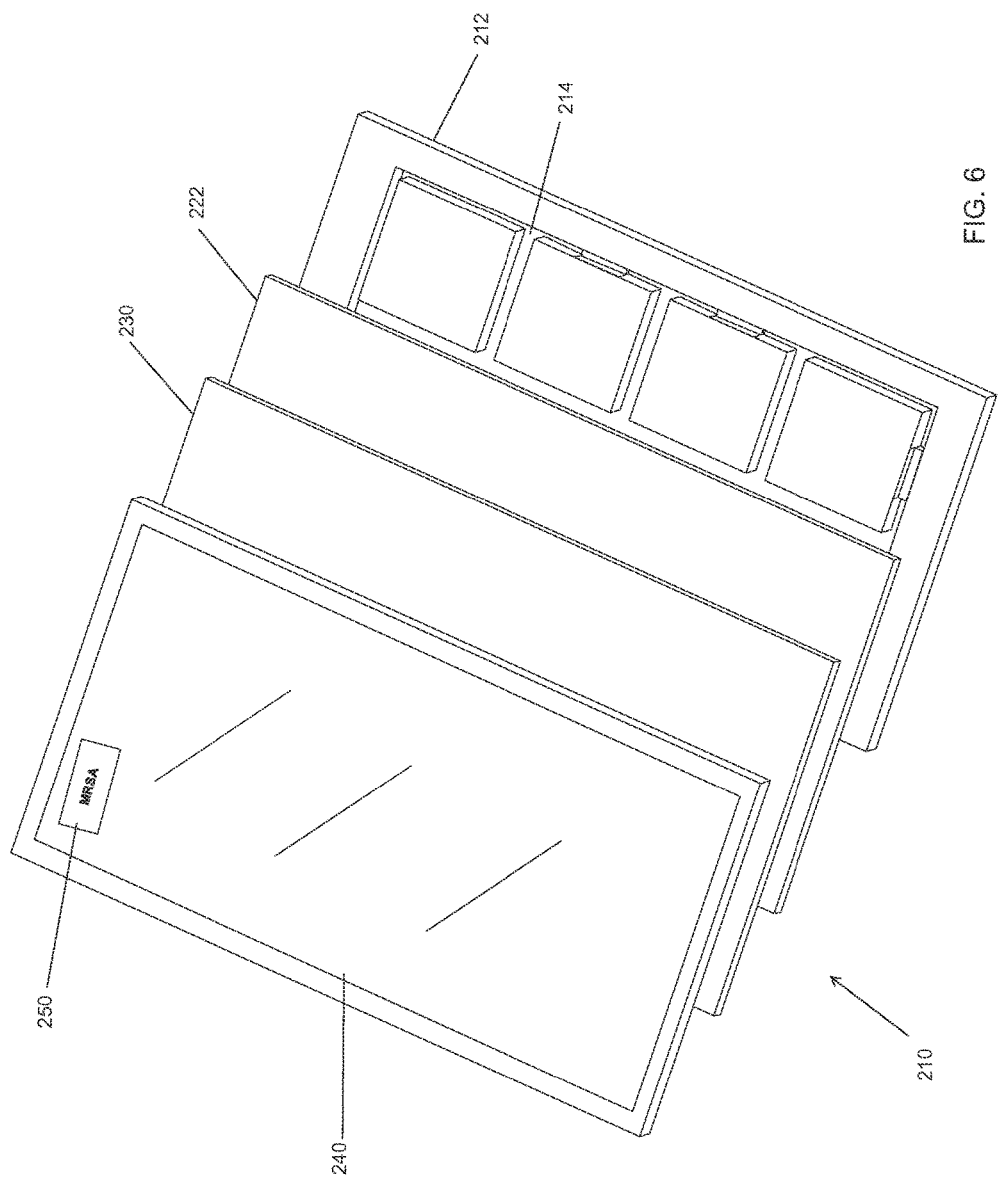
FIG. 6 is an exploded view of the display assembly of FIG. 4.

Referring to FIGS. 4 through 6, in an alternative preferred embodiment of a display assembly 210 a base 212 made of polymeric material includes a set of channels 214 and a peripheral wall 216, configured so that if the backside 220 of base 212 is pressed against a flat surface, both the back side of channels 214 and the furthest extent of peripheral wall 216, which are flush with each other, will lie flush on the flat surface. This permits easy attachment of base 212 to a wall, door or other surface, by means of a set of screws driven through the base 212 at one or more channels 214. A set of magnets 218 are either fastened to the backside 220 of base 212, inculcated into the polymeric material of base 212 or mounted in apertures in base 212. A steel plate 222 is then placed onto base 212 and is retained by means of magnets 218. Printed media 230, which in a preferred embodiment is rigid, is placed over plate 222, and retained by a cover 240, that includes a peripheral rearward extending wall 242 that is retained by a slight pressure against peripheral wall 216, and by the top portion of peripheral wall 216 holding up the top part of peripheral wall 242, which rests upon wall 216. The assembly further includes magnetic elements 250, for placing on cover 240, and having some graphical information on the side that is then visible to a viewer, to provide some indication to the viewer.

The many advantages of assembly 210 may now be considered. The entire assembly can be quite light, as base 212, printed media 230 and cover 240 can be made of lightweight polymeric material and steel plate 222 can be as little as 0.1 mm thick, as in the embodiment of assembly 210 plate 222 is not used for structural support. If it is to be used in a hospital room, assembly printed media can indicate where information can be written on cover 240 with a marker provided for this purpose. If a patient is allergic to a medicine or a food, a magnetic element 250 bearing this information in a bright and bold manner may be placed on cover 240 and retained by magnetic force to plate 222, thereby providing a very clear warning, that may be very difficult to fail to notice. In this manner a hospital can facilitate the task of the medical staff in ensuring that health care workers are clearly notified of the many important factors that must be taken into account in providing patient care. This is always a huge challenge in a busy hospital that must provide appropriate service to a broad array of patients having many idiosyncrasies in their conditions. Also, because no wood or laminated materials are used in assembly 210 it can be exposed to water, for example during a terminal clean, or as an outside display periodically exposed to rain or cleaning fluids, without fear of damage being incurred.

Because it is releasably retained by magnets 218, steel plate 222 does not obstruct installation of base 212, and further permits easy removal in the event that assembly 210 and the set of screws must be accessed for removal. Also, assembly 210, could be prepared with a graphic representing an organ or the human body as whole on printed media 230, thereby serving as an educational material that directly benefits patients. Such an assembly 210 would permit a physician to mark on the cover 240, for example to help explain a procedure to a patient, thereby greatly facilitating physician patient communications. Further, such an assembly could display the name of a pharmaceutical company or a pharmaceutical and could be distributed as a service to hospitals by a pharmaceutical company, without violating current law.

Further, using a set of assemblies 210, it would be possible to implement a system and method in a hospital for increasing staff awareness of patient conditions requiring special measures. Each of a set of patient rooms is equipped with an assembly 210 for each bed in the room. When a new patient is admitted to the room, patient identifying information is written on the cover 240 with markers that are also provided. Then, if the patient has a condition requiring special treatment, such as MRSA, a magnetic element 250, taken from a set of magnetic elements 250 provided, which collectively can provide warning for any one of a number of different conditions requiring special treatment is stuck on the cover 240 and retained magnetically by magnetic attraction to steel plate 222. Elements 250 may be color-coded by condition type and each may bear a distinctive design, so that a medical staff member is quickly made aware of the patient condition or conditions requiring special handling.

In a further detail, a pair of raised areas 260 in a transverse one of channels 214 facilitates attachment of a tray for markers. Such a tray is made of polymeric materials and is wedged into channel 214 and held in place by the channel walls and by raised areas 260. In like manner, a pair of raised areas 270 in a longitudinal channel facilitate the attachment of a marker tray if the board is oriented so that it extends horizontally more than vertically. The advantage of a marker tray made of a polymer and held in a channel by raised areas 260 or 270 is that if a person accidentally walks into such a tray it is easily dislodged. Accordingly it is far less likely, both because of the softer polymeric material used and because it is more easily dislodged to injure a person who encounters it.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A media display assembly, comprising:
   a. a base assembly, including a base and a steel plate, which forms a front surface of said base assembly and is removeably affixed to said base;
   b. a cover, including a polymeric sheet having transparent display portion and a rearward extending peripheral wall, said peripheral wall snugly fitting said base assembly; and
   c. display media interposed between said steel plate and said cover.

2. The media display assembly of claim 1, wherein:
   a. said base is polymeric and has a front surface;
   b. a plurality of magnets are located behind said front surface; and
   c. wherein said plurality of magnets magnetically support said steel plate.

3. The media display assembly of claim 1, consisting entirely of non-porous medical grade material.

4. The media display assembly of claim 1, weighing less than 1.0 pounds per square foot of display space.

5. The media display assembly of claim 1, weighing less than 0.8 pounds per square foot of display space.

6. The media display assembly of claim 1, further including a non transparent peripheral margin at least partially surrounding said transparent display region.

7. The media display assembly of claim 6, wherein said non transparent peripheral margin has been printed on said cover.

8. The media display assembly of claim 1, wherein said display media is printed media.

9. The media display assembly of claim 8, wherein said printed media is rigid.

10. The media display assembly of claim 1, further including at least one message bearing magnetic element, retained on said cover by magnetic attraction to said steel plate.

11. The media display assembly of claim 10, wherein said magnetic elements are mutually distinguishable.

12. The media display assembly of claim 10, wherein one of said magnetic elements displays a warning about a medical condition.

13. A display assembly, comprising:
   a. a base made of polymeric material, having a front wall of at least one hundred square centimeters in area, and a rearward extending base peripheral wall of at least 0.5 cm height, said front wall having a front surface and having recessed regions, wherein said recessed regions are recessed such that the back of said recessed regions extend at least as far back as said peripheral wall at its furthest rearmost extent, so that when said base is placed against a flat surface said back of said recessed regions touch said flat surface;

b. a polymeric cover adapted to fit over said base, said polymeric cover including a generally transparent front wall, and a rearward extending cover peripheral wall, sized to fit about said base peripheral wall, so that when said cover is placed over said base there is a slight tension between said cover peripheral wall and said base peripheral wall; and c. display media interposed between said base and said cover.

14. The display assembly of claim 13, further including a set of fasteners extending through said front wall at one or more recessed regions and being embedded into a supporting wall behind said display assembly, so that said display assembly is mounted on said surface.

15. The display assembly of claim 13, further including a steel plate interposed between said base and said display media.

16. The display assembly of claim 13, wherein said display media is rigid, thereby facilitating placement over said base prior to being covered by said cover.

17. The display assembly of claim 16, wherein said display media is a rigid piece of printed polyvinyl chloride.

18. The display assembly of claim 13, wherein said cover includes a printed border, appearing to a viewer as a frame for said display media.

\* \* \* \* \*